US006278448B1

(12) United States Patent
Brown et al.

(10) Patent No.: US 6,278,448 B1
(45) Date of Patent: *Aug. 21, 2001

(54) COMPOSITE WEB PAGE BUILT FROM ANY WEB CONTENT

(75) Inventors: Christopher R. Brown, Seattle; Michael A. Schmidt, Issaquah; Sankar Ramasubramanian, Redmond; Sean L. Flynn, North Bend; Edward Jason Anderson, Duvall; Matthew C. Squires, Redmond, all of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/024,673

(22) Filed: Feb. 17, 1998

(51) Int. Cl.[7] .................................................... G06F 3/00
(52) U.S. Cl. ............................................ 345/333; 345/348
(58) Field of Search ................................ 345/333, 334, 345/339, 342, 348; 707/501, 513, 530

(56) References Cited

U.S. PATENT DOCUMENTS

| 5,724,595 | * | 3/1998 | Gentner | 707/501 |
| 5,737,560 | * | 4/1998 | Yohanan | 345/349 |
| 5,877,765 | * | 3/1999 | Dickman et al. | 345/349 |
| 5,877,767 | * | 3/1999 | Yohanan | 345/357 |
| 5,880,730 | * | 3/1999 | Durand | 345/348 |
| 5,890,170 | * | 3/1999 | Sidana | 707/501 |
| 5,914,714 | * | 6/1999 | Brown | 345/339 |
| 6,061,695 | * | 5/2000 | Slivka et al. | 707/513 |
| 6,091,409 | * | 7/2000 | Dickman et al. | 345/329 |

* cited by examiner

Primary Examiner—Crescelle N. dela Torre
(74) Attorney, Agent, or Firm—Christensen O'Connor Johnson & Kindness PLLC (57) ABSTRACT

A method of creating a composite desktop built from Web content retrieved from one or more Web sites is disclosed. A component on a Web page can be selected and positioned on the composite desktop. The component can be a static image or an active desktop component providing dynamic content. An entire Web page can also be selected and positioned as a component on the composite desktop. Components can be selected for the composite desktop using one of several mechanisms. Selection of a control on a Web page causes the selection of a corresponding component on the Web page. A control panel utility allows the designation of a URL to select the corresponding Web page for inclusion as a component on the composite desktop. Images from Web pages and objects representing URLs can be dragged and dropped onto the composite desktop. Icons on a composite desktop are displayed in front of the composite desktop components. A user can create multiple composite desktops and switch to a different desktop when desired.

21 Claims, 8 Drawing Sheets

COMPOSITE WEB PAGE BUILT FROM ANY WEB CONTENT

FIELD OF THE INVENTION

The present invention relates to the field of user interface desktops and, in particular, to methods and systems for incorporating content into such a desktop.

BACKGROUND OF THE INVENTION

With the advent of the Internet, it is now the case that personal computers have access to a much larger number and variety of resources (e.g. Web pages) than they currently do today on Local Area Networks. Since GUI desktops are typically designed to give the computer user a set of 'entry points' to all of the resources they care about, it is compelling to enhance the GUI desktop so that it can serve entry points to a much wider variety of resources, particularly those found on the World Wide Web.

Prior art GUI desktops have represented such 'entry points' with icons, each of which typically fits a strict form factor (e.g., 32×32 pixels and a line or two of text). This type of representation does not scale well to the variety of resources on the World Wide Web, since it is limited in size, strict in form factor, and static (unchanging). The invention described here is designed to provide a way for a GUI desktop to more adequately provide 'entry points' to Internet resources (primarily, HTML-based Web pages); these 'entry points' scale better to Web pages because: a) they can be any size (customizable by user OR by the Web author); b) the representation is not strict, and so, for instance, instead of a static icon the entry point can be used to show a 'preview' of the Web pages they point to; and c) the representation is not static but can instead change over time to reflect the changing nature of the resource (e.g. Web page).

In short, it is the intent of the current invention to enhance the GUI desktop by introducing a 'new breed' of entry points (or "shortcuts") to Internet resources, as an addition to the icon entry points that exist in prior art desktops.

It is now common for computer operating systems to employ a graphical user interface (GUI) to convey information to, and receive commands from, users. An example of an operating system that provides a graphical user interface is the Windows 95 operating system, produced by Microsoft Corporation of Redmond, Wash.

The graphical user interface of Windows 95, and other operating systems, is based on a desktop metaphor. More specifically, the GUI creates a graphical environment that simulates working at a desk. The graphical elements displayed on the computer desktop are analogous to objects placed on the top of a user's desk.

The desktop of a GUI is a screen display containing icons representing programs, files, and resources available to the user. The desktop acts as a launching point for running application programs, opening documents or files, and initiating operating system services. In a typical GUI, the desktop always remains as a full screen background display, and all visible windows and icons overlay the desktop as would paper documents and other items on top of an actual desk.

Icons placed on a desktop are static graphic images, and typically represent computer programs, files, or operating system services "Activation" of an icon may cause the operating system to invoke an associated program and optionally an associated file or data set.

Windows in a GUI can typically be resized, moved around the display, and stacked so as to overlay each other. Windows typically have a top-to-bottom order in which they are displayed, with top windows at a particular location on the screen overlaying any other window at the same location.

In recent years there has been a proliferation of computers connected to a global network known as the Internet. A "client" computer connected to the Internet can download digital information from "server" computers connected to the Internet. Client application software executing on client computers typically accept commands from a user and obtain data and services by sending requests to server applications running on server computers connected to the Internet.

Client computers access data on the World Wide Web, often referred to as "the Web." The World Wide Web is an information service on the Internet providing documents and links between documents. The World Wide Web is made up of numerous websites around the world that maintain and distribute Web documents. Web documents may be in one of a number of formats, including the Hyper Text Markup Language (HTML). An HTML document can contain text, graphics, audio clips, and video clips, as well as metadata or commands providing formatting information. HTML documents also include embedded "links," referred to as "hyperlinks," that reference other data or documents located on the local computer or network server computers. An intranet is a local area network containing at least one Web server and multiple client computers operating in a manner similar to the World Wide Web.

A Web browser is a client application or operating system utility that communicates with server computers using one or more protocols, including the Hyper Text Transfer Protocol (HTTP). Web browsers receive Web documents from the network and present them to a user. Internet Explorer, available from Microsoft Corporation, is an example of a popular Web browser.

In addition to data and metadata, HTML documents can contain embedded software components containing program code that perform a wide variety of operations, such as manipulating data, updating the displayed data, and playing audio or video clips. ActiveX is a specification developed by Microsoft Corporation for creating software components that can be embedded into an HTML document.

It is desirable to have a mechanism that allows a user to specify Web "content" from one or more Web pages, to be positioned on the user's desktop. Preferably, the Web content includes both static images and active images, where the active images may include animation, or occasional updates of the displayed content. A preferred mechanism allows a user to set up more than one desktop, and to switch between desktops as desired.

SUMMARY OF THE INVENTION

In accordance with this invention, a system and a computer-based method of creating a composite desktop built from Web content retrieved from one or more Web sites are provided. The method includes selecting one or more components of Web pages to be positioned on the composite desktop. Preferably, the component is either a static image, an active desktop component, or an entire Web page. Preferably, desktop components are displayed behind icons. Each component has an associated section of hypertext markup language instructions, and is displayed on the composite desktop in the same manner as it is displayed on a Web page.

In accordance with other aspects of the invention, a user specifies each component that is to be placed on the composite desktop. The mechanism of the invention stores information pertaining to the selection in a system registry, and inserts associated hypertext markup language instructions in a file corresponding to the composite desktop. The hypertext markup language instructions are used to display each component on the composite desktop.

In accordance with still other aspects of the invention, an icon window includes icons displayed on the composite desktop, organized as a transparent window or a complex regional window made up of discontiguous regions. Each region includes a portion of an icon or an entire icon. The icon window is displayed as a layer in front of the desktop components and the desktop background, so that the icons appear in front of the desktop components.

In accordance with yet still other aspects of the invention, an application programming interface (API) is provided to allow computer programs, controls, or utilities modify the composite desktop. Specifically, the API allows desktop components to be added to or deleted from the composite desktop, and allows desktop components to be modified. The API also allows the background wallpaper to be modified.

In accordance with further aspects of the invention, a user is provided with alternative ways of modifying the composite desktop. A component installation control embedded in a Web page installs a corresponding component from the Web page to the composite desktop. Alternatively, a control panel utility allows a user to specify a URL corresponding to a desired composite desktop component for inclusion on the composite desktop. A user may also drag and drop an image or a URL from a Web page onto the composite desktop to add a new component.

As will be readily appreciated from the foregoing description, a system and method for creating a composite desktop from Web content provides a way of displaying composite desktop components on a desktop in a readily available manner. The invention allows a composite desktop to display images from any Web page in front of a background wallpaper. The invention further allows the display of active components that regularly update their display according to preprogrammed mechanisms, such as retrieving new data from a Web site. By providing several mechanisms for selecting and positioning desktop components, the invention allows a user to easily configure a desired composite desktop. The invention further allows a user to create multiple composite desktops, and switch between the composite desktops when desired.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention provides a mechanism for creating or customizing a user interface composite desktop by selecting various components and adding them to a desktop. The composite desktop is implemented as a Web page, and the creation of the composite desktop includes building a composite Web page made up of one or more components selected and retrieved from one or more locations. The locations may include Web pages, local storage media, or remote computers. A component can be a static graphic object, or an active component that modifies its content or interacts with a user. Examples of active components include Web pages and ActiveX controls. The invention includes an application programming interface (API) for modifying the user interface desktop contents. The invention further includes a control object that is included in a Web page for allowing a user to select content from the Web page for insertion onto the desktop, and a control panel programmed for installing an entire Web page as a desktop component.

Figure 1:
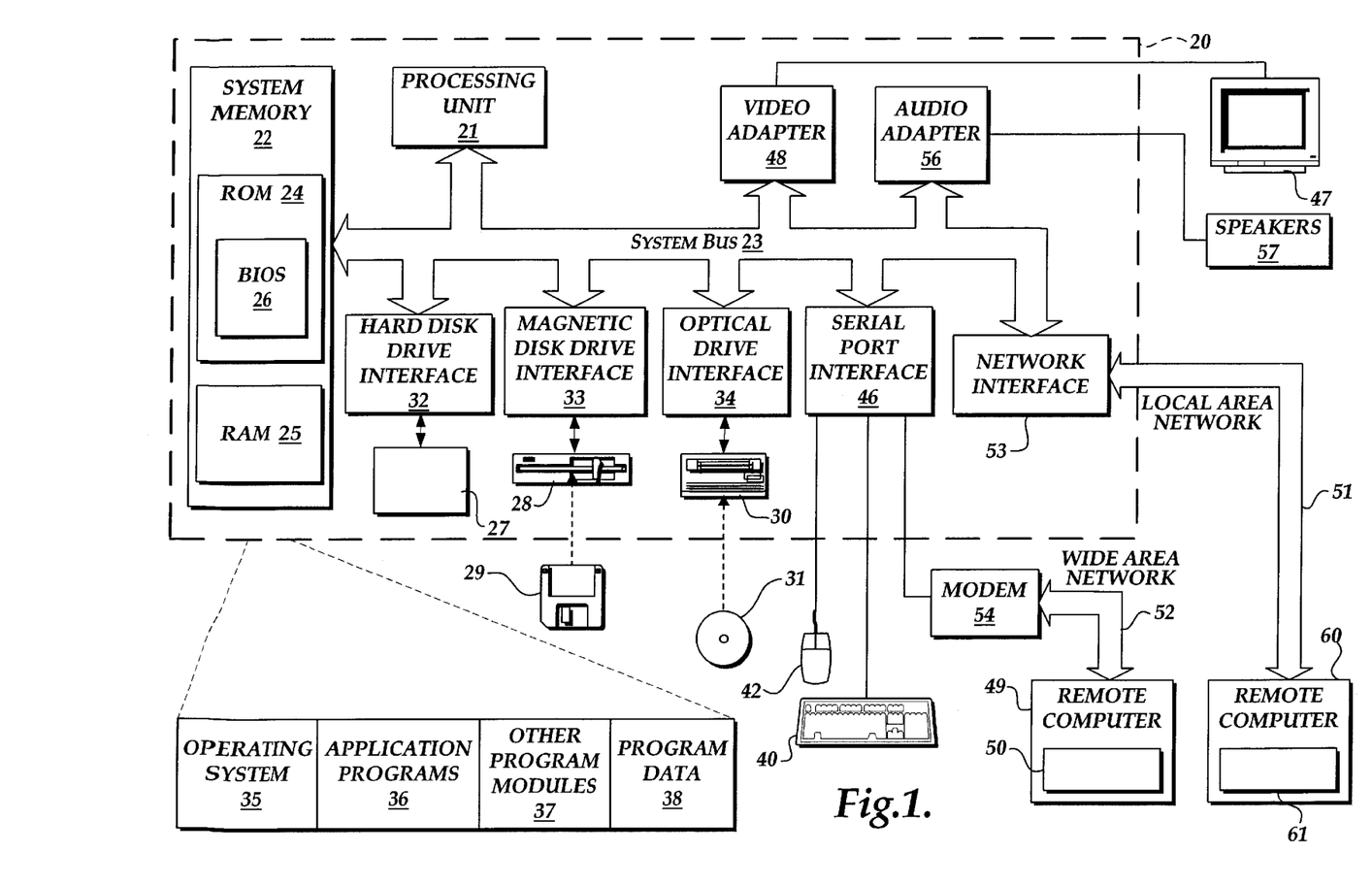
FIG. 1 is a block diagram of a general purpose computer system for implementing the present invention.

In accordance with the present invention, an operating system user interface shell program executes on a computer, preferably a general purpose personal computer. FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. One or more speakers 57 are also connected to the system bus 23 via an interface, such as an audio adapter 56. In addition to the monitor and speakers, personal computers typically include other peripheral output devices (not shown), such as printers.

The personal computer 20 operates in a networked environment using logical connections to one or more remote computers, such as remote computers 49 and 60. Each remote computer 49 or 60 may be another personal computer, a server, a router, a network PC, a peer device or other common network node, and typically includes many or all of the elements described above relative to the personal computer 20, although only a memory storage device 50 or 61 has been illustrated in FIG. 1. The logical connections depicted in FIG. 1 include a local area network (LAN) 51 and a wide area network (WAN) 52, Such networking environments are commonplace in offices, enterprise-wide computer networks, intranets and the Internet. As depicted in FIG. 1, the remote computer 60 communicates with the personal computer 20 via the local area network 51. The remote computer 49 communicates with the personal computer 20 via the wide area network 52.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
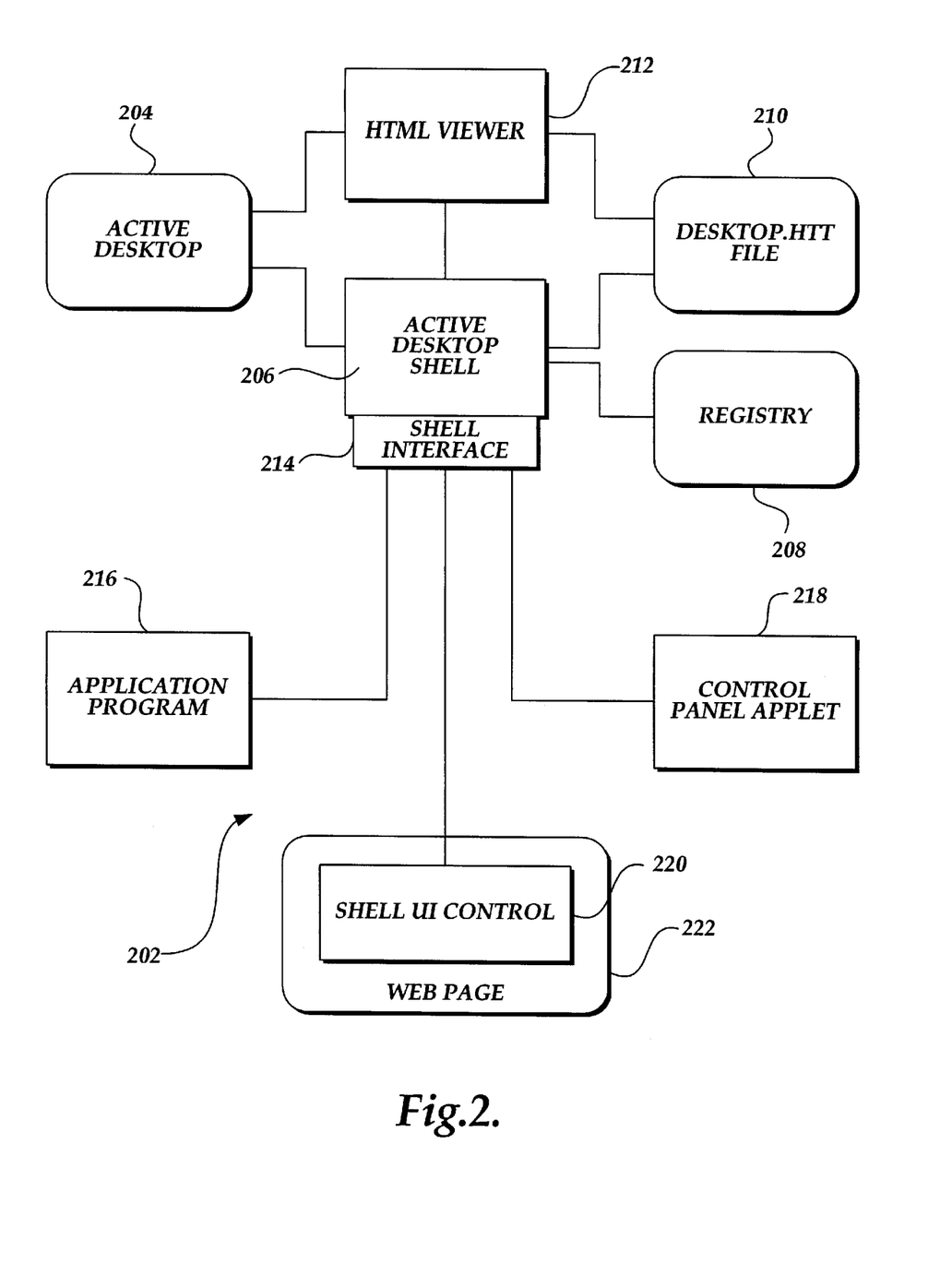
FIG. 2 is a block diagram illustrating an architecture of the present invention.

FIG. 2 illustrates the architecture of one actual embodiment of the invention. As depicted in FIG. 2, a system 202 for manipulating and viewing a composite desktop 204 includes a composite desktop shell 206 as the core object controlling the composite desktop. In the actual embodiment, the composite desktop shell 206 is implemented as a component object model (COM) object. COM is a standard protocol that software objects employ when communicating with other objects. An object that employs the COM protocol is referred to as a COM object. The composite desktop shell 206 manages the updating of composite desktop information in a registry 208. A registry is a mechanism for storing program data, and preferably includes one or more files on a persistent storage medium and associated code for accessing the data. The registry 208 operates as a database of information pertaining to one or more application programs that execute on the personal computer 20 (FIG. 1). The Windows 95 operating system provides a system registry that is employed by multiple application programs to store configuration information for subsequent retrieval. In one actual embodiment, the registry 208 is the system registry provided by Windows 95. The composite desktop shell 206 adds, deletes and modifies registry 208 data pertaining to the composite desktop 204.

The composite desktop 204 uses the composite desktop information stored in the registry 208 to generate hypertext markup language (HTML) instructions, and stores the instructions in an HTML file, referred to as the desktop.htt file 210. The desktop.htt file 210 contains the HTML instructions necessary to display the composite desktop 204. An HTML viewer 212 reads the desktop.htt file 210, interprets the instructions, and generates a composite desktop display.

The composite desktop shell 206 provides an interface, referred to as the shell interface 214 to allow manipulation of the composite desktop 204. In one actual embodiment, the shell interface is a COM application programming interface (API), which is described in further detail below. The API allows a program component to manipulate the composite desktop.

The invention includes three mechanisms for manipulating the composite desktop by using the shell interface 214: an application program, a control panel applet, and a program control. In one mechanism, an application program 216 can add, delete, or modify components on the composite desktop 204. The application program 216 can be one of a variety of application programs or program components capable of communicating with the shell interface 214.

The invention also provides a control panel applet 218, which is an auxiliary program to the system control panel. The system control panel is a part of an operating system, such as the Windows 95 operating system, and is used to configure a variety of system elements. The control panel applet 218 uses the shell interface 214 to manipulate the composite desktop. The functions and usage of the control panel applet are described in further detail below.

The invention further provides a program control, referred to as a shell user interface control 220, which also uses the shell interface 214 to manipulate the composite desktop 204.

The shell user interface control 220 is typically embedded within a Web page 222 and associated with a corresponding component on the Web page. Selection of the shell user interface control 220 causes the control to invoke the composite desktop shell 206 by using the shell interface 214, in order to add the corresponding component to the composite desktop. These operations are discussed in further detail below.

Figure 3A:
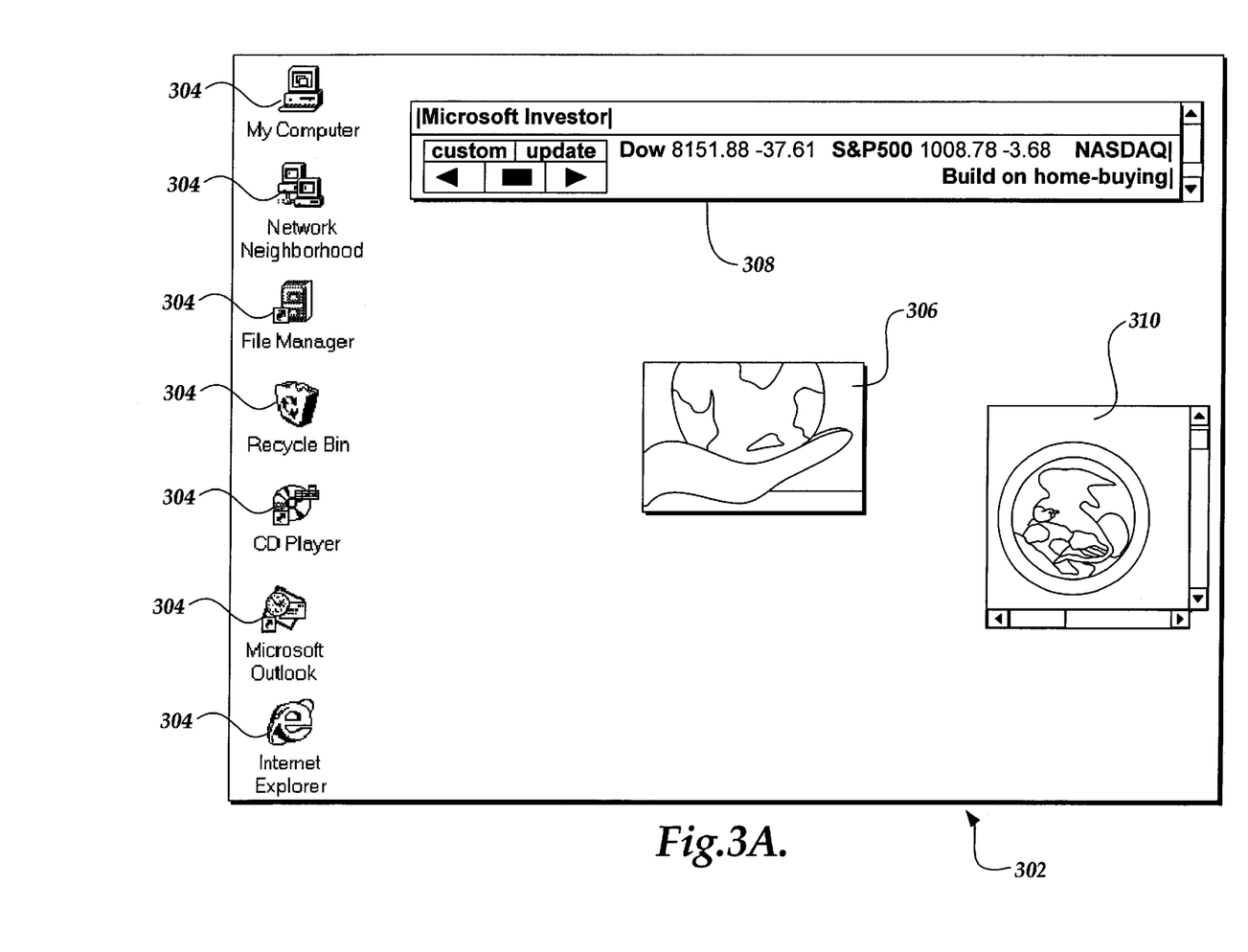
FIG. 3A is a pictorial representation of a user interface desktop, created in accordance with the present invention.

FIG. 3A illustrates an exemplary desktop, referred to as a composite desktop 302, produced and displayed on a monitor 47 (FIG. 1) of a personal computer 20 in accordance with the present invention. In one actual embodiment of the invention, the HTML viewer 212 (FIG. 2) displays the composite desktop 302 according to the HTML commands within the DESKTOP.HTT file. The contents of a DESKTOP.HTT file is described in further detail below. As depicted in FIG. 3, a set of icons 304 is also displayed on the monitor 47. Each icon corresponds to a program file, a program, or a resource that is invoked when a user selects and activates the icon.

The composite desktop 302 includes one or more desktop components. A desktop component is a distinct geometric region that displays a single piece of Web-based content. Desktop components can be positioned at any location on a composite desktop, and can be resized if desired. Desktop components can be layered on top of other desktop components. The exemplary desktop 302 depicted in FIG. 3A includes a static desktop component 306, an "active" desktop component 308, and a "Web page" desktop component 310. As depicted, the static desktop component 306 corresponds to a graphic image retrieved from the personal computer 20 or from a remote computer 49 or 60 (FIG. 1). The graphic image may be selected from a Web page. The invention allows a user to select any graphic image from a Web page for insertion onto the composite desktop 302.

The active desktop component 308 corresponds to a component retrieved locally or from a remote computer. The remote computer may be accessed via a local area network or a wide area network. The component may be selected from a Web page, within which the component is embedded. The process of selecting components embedded within Web pages for inclusion in a composite desktop is explained in further detail below. The Web page desktop component 310 corresponds to an entire Web page that was selected for inclusion within the composite desktop 302. The process of selecting Web pages for inclusion as desktop components on a composite desktop is described in further detail below.

Figure 3B:
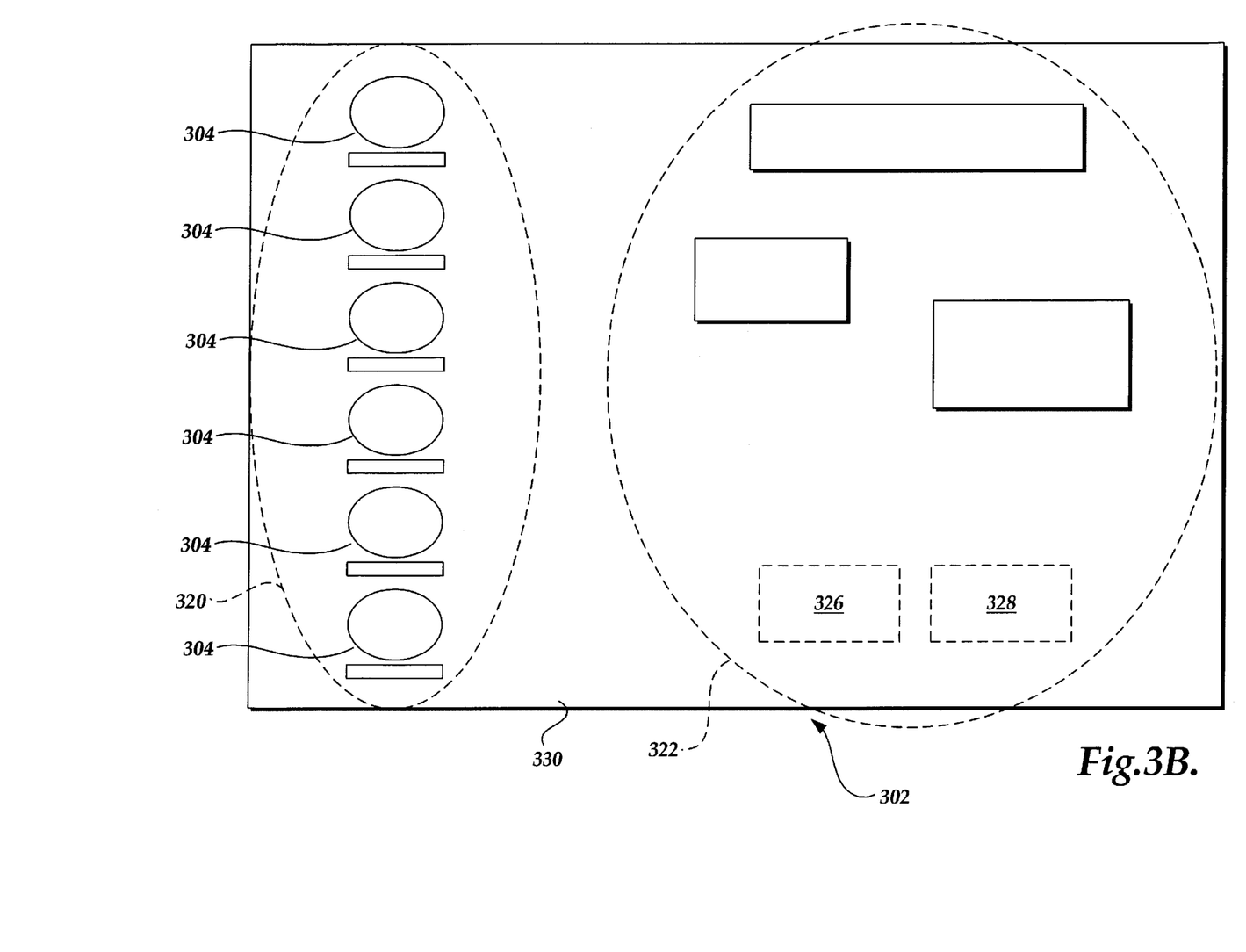
FIG. 3B illustrates the layers used to create the user interface desktop of FIG. 3A.

FIG. 3B illustrates the layers that comprise the composite desktop 302 of FIG. 3A. As depicted in FIG. 3B, an icon layer 320, comprising the icons 304, is the topmost layer of the composite desktop 302. Behind the icon layer, an HTML layer comprises two sublayers: a desktop components sublayer 322 and a background layer 330. The background sublayer 330, also known as the "wallpaper," is behind the desktop components sublayer 322. The desktop components sublayer 322 includes the desktop components, a windowed component manipulation control 326 and a windowless component manipulation control 328. These controls are normally not visible, and are used to move and resize desktop components. The use of the windowed component manipulation control 326 and the windowless component manipulation control 328 is explained in further detail below. The HTML viewer 212 (FIG. 2) displays the HTML layer on the composite desktop 302.

In one actual embodiment, the icons 304 are displayed in front of the desktop components by creating two windows, one corresponding to the icon layer 320, and one corresponding to the HTML layer. The window corresponding to the icon layer is referred to as the icon window. A transparent window or a complex regional window comprising all of the regions within each icon is created to make the icon window. The regions of the window may be discontiguous. By keeping the icon window "in front of" the HTML window, icons are always painted in front of desktop components and the composite desktop background.

The invention includes an application programming interface (API) for modifying the composite desktop contents. In particular, the API is used to modify the desktop components and the background sublayer. This allows a computer program to modify the HTML layer during its execution. Following is a listing of an API in one actual embodiment of the invention.

```
DECLARE_INTERFACE_(IActiveDesktop, IUnknown)
{
// IUnknown methods
STDMETHOD (QueryInterface)(THIS_REFIID riid, void ** ppv) PURE;
STDMETHOD_(ULONG, AddRef) (THIS) PURE;
STDMETHOD_(ULONG, Release) (THIS) PURE;
// IActiveDesktop methods
STDMETHOD (ApplyChanges)(THIS_DWORD dwFlags) PURE;
STDMETHOD (GetWallpaper)(THIS_LPWSTR pwszWallpaper, UINT
    cchWallpaper,
DWORD dwReserved) PURE;
STDMETHOD (SetWallpaper)(THIS_LPCWSTR
    pwszWallpaper, DWORD dwReserved) PURE;
STDMETHOD (GetWallpaperOptions)(THIS_LPWALLPAPEROPT
    pwpo, DWORD dwReserved) PURE;
STDMETHOD (SetWallpaperOptions)(THIS_LPCWALLPAPEROPT
    pwpo, DWORD dwReserved) PURE;
STDMETHOD (GetPattern)(THIS_LPWSTR pwsZPattern,
    UINT cchPattern, DWORD dwReserved) PURE;
STDMETHOD (SetPattern)(THIS_LPCWSTR pwsZPattern, DWORD
    dwReserved) PURE;
STDMETHOD (GetDesktopItemOptions)(THIS_
    LPCOMPONENTSOPT pco, DWORD dwReserved) PURE;
STDMETHOD (SetDesktopItemOptions)(THIS_
    LPCCOMPONENTSOPT pco, DWORD dwReserved) PURE;
STDMETHOD (AddDesktopItem)(THIS_LPCCOMPONENT
    pcomp, DWORD dwReserved) PURE;
STDMETHOD (AddDesktopItemWithUI)(THIS_HWND hwnd,
    LPCOMPONENT pcomp,
DWORD dwReserved) PURE;
STDMETHOD (ModifyDesktopItem)(THIS_LPCCOMPONENT pcomp,
    DWORD dwFlags) PURE;
// the dwFlags parameter can contain one or more of the following flags to
    indicate what fields of the Component need to be modified.
COMP_ELEM_TYPE
COMP_ELEM_CHECKED
COMP_ELEM_DIRTY
COMP_ELEM_NOSCROLL
COMP_ELEM_POS_LEFT
COMP_ELEM_POS_TOP
COMP_ELEM_SIZE_WIDTH
COMP_ELEM_SIZE_HEIGHT
COMP_ELEM_POS_ZINDEX
COMP_ELEM_SOURCE
COMP_ELEM_FRIENDLYNAME
COMP_ELEM_SUBSCRIBEDURL
COMP_ELEM_ALL
STDMETHOD (RemoveDesktopItem)(THIS_LPCCOMPONENT pcomp,
    DWORD dwReserved) PURE;
STDMETHOD (GetDesktopItemCount)(THIS_
    LPINT lpiCount, DWORD dwReserved) PURE;
STDMETHOD (GetDesktopItem)(THIS_int nComponent,
    LPCOMPONENT pcomp, DWORD dwReserved) PURE;
STDMETHOD (GetDesktopItemByID)(THIS_DWORD dwID,
    LPCOMPONENT pcomp, DWORD dwReserved) PURE;
STDMETHOD (GenerateDesktopItemHtml)(THIS_LPCWSTR
    pwszFileName, LPCOMPONENT pcomp, DWORD
    dwReserved) PURE;
```

-continued

```
STDMETHOD (AddUrl)(THIS_HWND hwnd, LPCWSTR pszSource,
    LPCOMPONENT pcomp, DWORD dwFlags) PURE;
STDMETHOD    (GetDesktopItemBySource)(THIS_LPCWSTR
    pwszSource, LPCOMPONENT pcomp, DWORD
    dwReserved) PURE;
};
```

Structures:

```
typedef struct_tagCOMPONENT
    {
    DWORD dwSize;      //Size of this structure
    DWORD dwID;        //Reserved: Set it always to zero.
    int iComponentType; //One of COMP_TYPB_*
    BOOL fChecked;     // Is this component enabled?
    BOOL fDirty;       // Had the component been modified and
    not yet saved to disk?
    BOOL fNoScroll;    // Is the component scrollable?
    COMPPOS cpPos;     // Width, height etc.,
    WCHAR wszFriendlyName[MAX_PATH];    // Friendly
    name of component.
    WCHAR wszSource[INTERNET_MAX_URL_
    LENGTH]; //URL of the component.
    WCHAR wszSubscribedURL[INTERNET_MAX_URL_
    LENGTH]; //Subscribed URL
    }
```

COMPONENT;

```
typedef struc_tagCOMPPOS
    {
    DWORD dwSize;      //Size of this structure
    int  iLeft;        //Left of top-left corner in screen co-
ordinates.
int iTop;       //Top of top-left corner in screen co-ordinates.
    DWORD dwWidth;     // Width in pixels.
    DWORD dwHeight;    // Height in pixels.
    int izIndex;       // Indicates the Z-order of the component.
    BOOL  fcanResize;  // Is the component resizeable?
    BOOL  fCanResizeX; // Resizeable in X-direction?
    BOOL  fCanResizeY; // Resizeable in Y-direction?
    int  iPreferredLeftPercent; //Left of top-left corner as percent of
    screen width
    int  iPreferredTopPercent;  //Top of top-left corner as percent of
    screen height
    }
```

COMPPOS;

```
typedef COMPONENT *LPCOMPONENT; typedef const COMPONENT
    *LPCCOMPONENT;
```

NOTE: Make sure you set the "dwSize" to the size of this structure before you make a call to any of these member functions. Otherwise, the call will fail.

STDMETHOD (ApplyChanges)(THIS_DWORD dwFlags) PURE;

The possible values for the flags are:

AD_APPLY_SAVE //Just save it to the registry

AD_APPLY_HTMLGEN //generate HTML from registry.

AD_APPLY_REFRESH //Refresh desktop using the HTML

AD_APPLY_ALL // Do all the above three things

// The above flags will work only if something has changed causing the dirty flag to be set internally. If you want to force this irrespective of whether the dirty bit is set or not, use the following flag in combination with the above flags.

AD_APPLY_FORCE // This can be used in combination with the above flags to force these things to happen even if the dirty bit is NOT set (meaning that no changes actually happened)

As can be seen in the above API, methods are provided for adding a component to the composite desktop, removing a component from the composite desktop, and modifying a component. The API provides a way of specifying the initial position and size of the desktop component, and indicating whether the desktop component can be resized in either the X-direction or the Y-direction.

Additional methods provide a way of retrieving the number of desktop components in a composite desktop, and retrieving objects corresponding to individual desktop components. Methods are also provided for retrieving and setting composite desktop wallpaper settings.

An ApplyChanges method provides a way of refreshing the composite desktop, storing the composite desktop data to the system registry, or generating HTML instructions corresponding to the composite desktop. Methods that request information result in the retrieval of the corresponding information from the system registry. Methods that add or modify the composite desktop result in changes to the corresponding information in the system registry.

Figure 4:
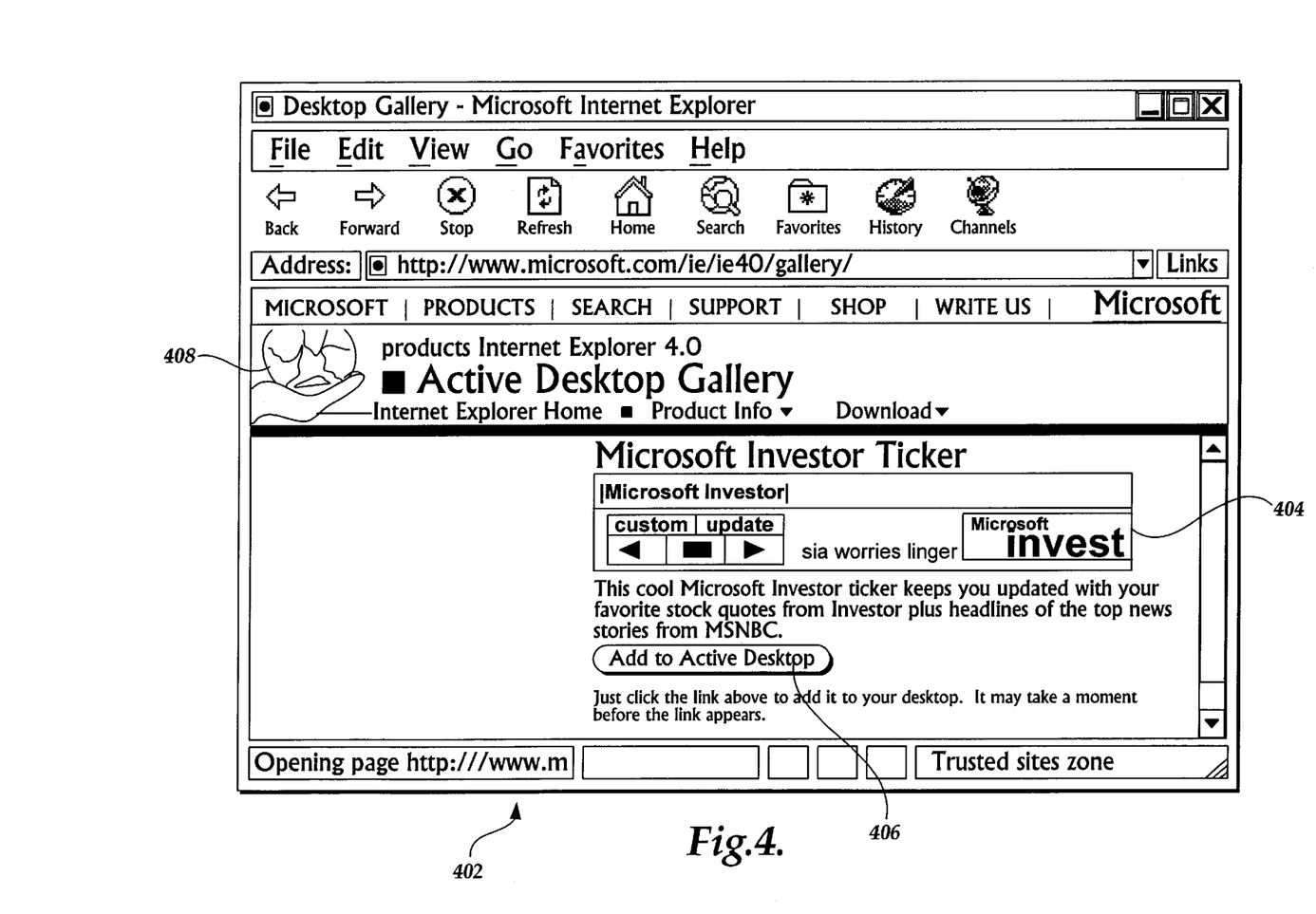
FIG. 4 is a pictorial representation of a Web page for providing content to a desktop in accordance with the present invention.

FIG. 4 illustrates an exemplary Web page 402 that is used for providing content to a composite desktop 302 (FIG. 3A). The Web page 402 includes a desktop component 404. A component installation control 406 corresponding to the desktop component 404 allows a user to "place" the desktop component 404 onto the composite desktop 302. Preferably, the component selection control 406 is implemented as an ActiveX control or as a link to a CDF file that describes the component. ActiveX is a specification developed by Microsoft Corporation for creating software controls that are embedded into an HTML document. By clicking on the component installation control 406, a user indicates that the corresponding desktop component 404 is to be placed on the composite desktop 302. The program code that implements the component selection control 406 adds the corresponding component to the composite desktop by using the API described above.

The Web page 402 illustrated in FIG. 4 also includes a static graphic image 408 that is selectable to be included in the composite desktop 302. As depicted in FIGS. 3A and 4, the static desktop image 408 corresponds to the static desktop component 306. To select a static graphic for inclusion in a composite desktop 302, a user controls a pointing device, such as a mouse, to "click" on the graphic image, "drag" the image to an area of the desktop, and "drop" the image by releasing the mouse button. Methods of dragging and dropping images are well known to those skilled in the art of computer programming, and are not explained in further detail herein. Alternatively, a component installation control 406 can be associated with a static graphic image so that clicking on the component installation control causes program code to add the corresponding static graphic image to the composite desktop, by using the API described above.

Figure 5:
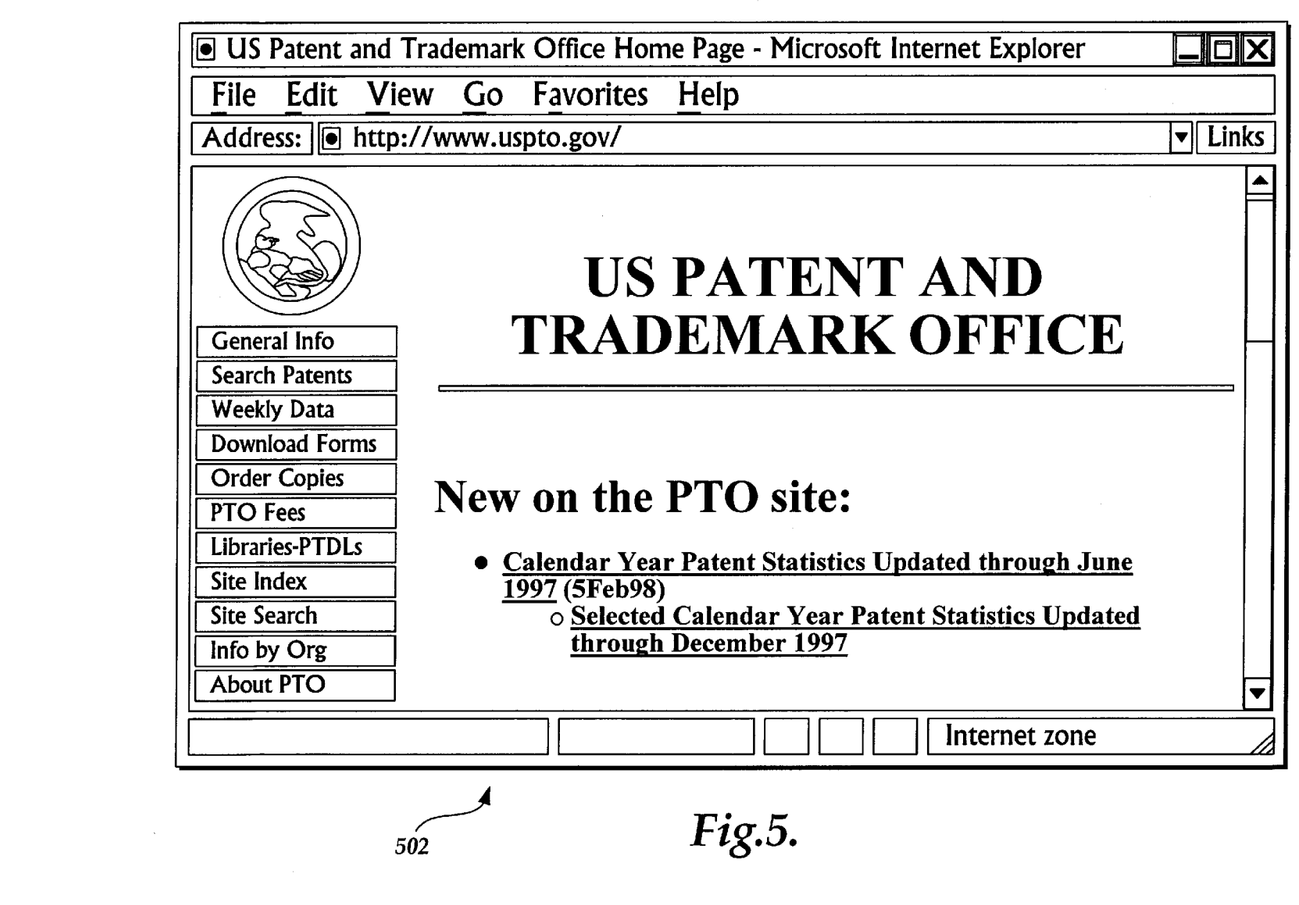
FIG. 5 is pictorial representation of a Web page for providing content to a desktop in accordance with the present invention.

FIG. 5 illustrates a Web page 502 that is available for conversion to a Web page desktop component 310 (FIG. 3A) to be included in a composite desktop 302. The Web page 502 can be any Web page and does not require special preparation to be used with the present invention.

Figure 6:
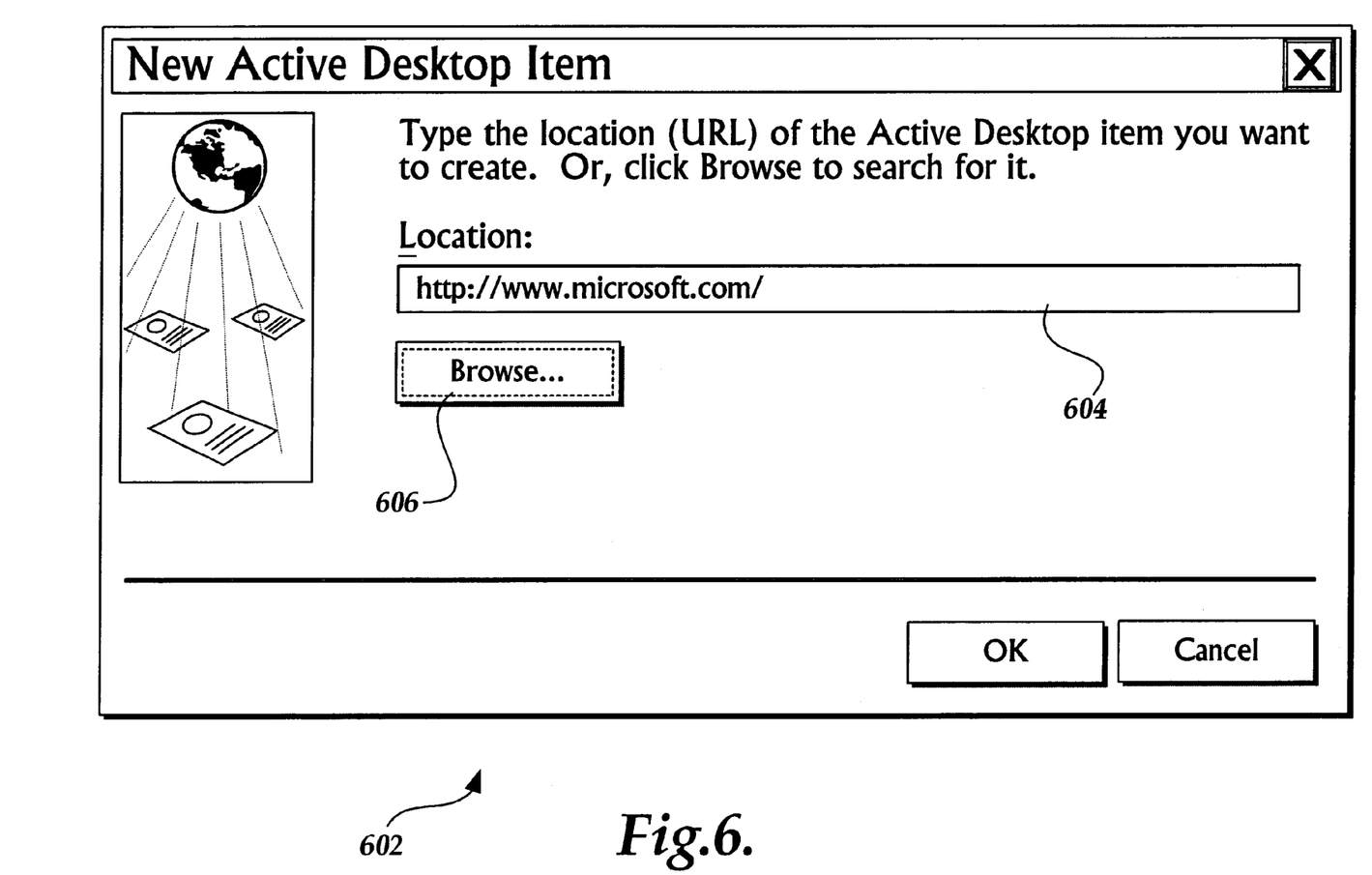
FIG. 6 illustrates a dialog window for creating a desktop component, in accordance with the present invention.

As discussed above, a component selection control 406 (FIG. 4) is used to select a corresponding desktop component to be inserted into a composite desktop 302 (FIG. 3). To install a Web page desktop component 310, a user specifies a URL corresponding to a desired Web page. FIG. 6 illustrates an exemplary dialog window 602 that allows a user to designate a URL to be used in creating a desktop component. The dialog window 602 is used to convert a Web page into a Web page desktop component 310 for inclusion in a composite desktop 302. To create a new Web page desktop component, a user enters a URL in a location edit box 604. Alternatively, the user can select the browse button 606 to "browse" the file system for composite desktop files. A user can also drag and drop any object representing a URL to the composite desktop to create a Web page desktop component.

The dialog window 602 is also used for adding static desktop components and active desktop components to the composite desktop. A user enters a URL designating the location of the image or the active desktop component in the location edit box 604. This provides a user with alternative mechanisms for configuring a composite desktop.

A Web page inserted onto a composite desktop as a Web page desktop component 310 functions similarly to the corresponding Web page viewed in a browser window. When a user clicks on a hyperlink within a Web page desktop component 310, a new browser window is created and the URL corresponding to the hyperlink is used to retrieve a Web page for display in the new browser window.

The DESKTOP.HTT file is a system file containing HTML code that is used to create the HTML layer. The composite desktop shell 206 (FIG. 2) creates the HTML code using composite desktop data contained in the registry 208. Following is a listing of an exemplary DESKTOP.HTT file corresponding to the HTML layer of the desktop 302 depicted in FIG. 3A. The line numbers at the beginning of each line are used for this discussion only, and are not part of an actual DESKTOP.HTT file. Line 5 describes the background sublayer 330, or a wallpaper, that is displayed on the desktop 302. The HTML instructions corresponding to the background layer should be readily understood by those skilled in the art of Web page construction, and others, and is discussed herein only as to explain the invention.

1. <!----
2. *** This file is automatically generated by Microsoft Internet Explorer 4.0 (deskhtml.dll)***
3. -------->
4. <HTML>
5. <BODY background="" style="border:none;" bgcolor= #000000 topmargin=0 leftmargin=0 rightmargin=0 bottommargin=0>
6. <IMG id=3 name="DeskMovr" src="http://www.microsoft.com/ie/images/ulg/ulg_ie40.jpg"
7. resizeable="XY"
8. subscribed_url="http://www.microsoft.com/ie/images/ulg/ulg_ie40.jpg"
9. style="BACKGROUND: transparent; position:absolute; LEFT: 347; TOP: 236; WIDTH: 120; HEIGHT: 82; Z-INDEX: 1006">
10. <IFRAME id=7 MARGINWIDTH=0 MARGINHEIGHT=0 name="DeskMovrW" src="http://www.uspto.gov/"
11. resizeable="XY"
12. subscribed_url="http://www.uspto.gov/"
13. frameborder=0 style="BACKGROUND: transparent; position:absolute; LEFT:620; TOP:254; WIDTH:156; HEIGHT:150; Z-INDEX:1014"></IFRAME>
14. <IFRAME id=8 MARGINWIDTH=0 MARGINHEIGHT=0 name="DeskMovrW" src="http://www.microsoft.com/ie/ie40/gallery/ticker.htm"
15. resizeable="XY"
16. subscribed_url="http://www.microsoft.com/ie/ie40/gallery/cdf/g_stock.cdf"
17. frameborder=0 style="BACKGROUND: transparent; position:absolute; LEFT:178; TOP:26; WIDTH:516; HEIGHT:57; Z-INDEX:1016"></IFRAME>
18. <OBJECT
19. classid="clsid:72267F6A-A6F9-11 D0-BC94-00C04FB67863"
20. id=ActiveDesktopMover
21. STYLE="position:absolute; container:positioned; LEFT: 0;TOP: 0; WIDTH: 0; HEIGHT: 0;zIndex: 5"
22. >
23. <param name="Interval" value=500>
24. <param name="SizerID" value="ActiveDesktopMover">
25. <param name="Enabled" value="True">
26. <param name="TargetName" value="DeskMovr">
27. param name="WindowOnly" value="False">
28. </OBJECT>
29. <OBJECT
30. classid="clsid:72267F6A-A6F9-11D0-BC94-00C04FB67863"
31. id=ActiveDesktopMoverW
32. STYLE="position:absolute; container:positioned; LEFT: 0;TOP: 0; WIDTH: 0; HEIGHT: 0;zIndex 19"
33. >
34. <param name="Interval" value=500>
35. <param name="SizerID" value="ActiveDesktopMoverW">
36. <param narne="Enabled" value="True">
37. <param name="TargetName" value="DeskMovrW">
38. <param name="WindowOnly" value="True">
39. </OBJECT>
40.  </BODY></HTML>

Lines 6–9 of the exemplary DESKTOP.HTT file contain HTML instructions corresponding to the static desktop component 306. Static desktop components are preferably implemented as image objects, and are designated by the IMG tag in HTML. Use of the IMG tag is well known in the art of Web page construction, and is discussed herein only as necessary to describe the invention. Image objects can be positioned anywhere on a screen. These instructions include an address specification indicating the location where a static graphic image is located. Specifically, the exemplary listing of HTML includes a Universal Resource Locator (URL) specifying the Internet location where the associated static graphic image is located. The address specification may also indicate a path to a file on a file system. In one embodiment, static desktop components are positioned "behind" active desktop components on the composite desktop 302.

Lines 14–17 comprise HTML instructions that describe the active desktop component 308 (FIG. 3A). Preferably, active desktop components are implemented as floating frames. Floating frames are rectangular regions that can be positioned anywhere on a screen. Floating frames are designated by the "IFRAME" tag. Floating frames are well known in the art of the Web page construction, and are not discussed in detail herein. These HTML instructions include a URL specifying an Internet location where additional HTML code corresponding to the active desktop component 308 resides. The HTML instructions on line 14 includes a URL corresponding to a CDF file. CDF files are used to implement "subscriptions" in which information is regularly retrieved and updated within the active desktop component 308. The use of CDF files is known to those skilled in the art of Web page construction and is not explained in further detail here. The Channel Definition Format (CDF) is described in more detail in Scott Isaacs *Inside Dynamic HTML*, Microsoft Press, Oct. 30, 1997, and is incorporated into the present specification by reference.

Lines 10–13 include HTML instructions that correspond to the Web page desktop component 310 (FIG. 3A). Web page desktop components are also implemented as floating frames, and are specified by the IFRAME tag. As described above for the active desktop component 308, these HTML instructions include a URL that is used to locate the Web page corresponding to the Web page desktop component 310.

Lines 18–28 contain HTML instructions that are used to specify the windowless component manipulation control 328. Preferably, this control is implemented as an ActiveX control and the corresponding HTML includes a specification of the ActiveX control. The use of ActiveX controls and their corresponding HTML instructions is well known to those skilled in the art of Web page programming, and is not discussed in further detail herein. Lines 29–39 correspond to the windowed component manipulation control 326, and are similar to the HTML instructions described above corresponding to the windowless component manipulation control. The windowed component manipulation control 326 is also preferably implemented as an ActiveX control. The windowed component manipulation control 326 allows a user to move and resize the active desktop components 308. The windowless component manipulation control 328 allows a user to move and resize the static desktop components 306. Component manipulation controls are described in further detail in the copending patent application, Managing Position and Size for a Desktop Component, by Brown et al., filed on Feb. 17, 1998, having attorney docket number MSFT-1-11313, which is incorporated herein by reference in its entirety.

The invention has been described herein as including an HTML window that contains the HTML layer 322 illustrated in FIG. 3B. In a preferable embodiment, the invention allows a user to create multiple composite desktops, each desktop having a corresponding HTML layer comprising a background and a set of desktop components. Each composite desktop has an associated DESKTOP.HTT file containing HTML instructions to create its corresponding composite desktop. A user selects a desired composite desktop to be used, and can change the selection when desired.

Figure 7:
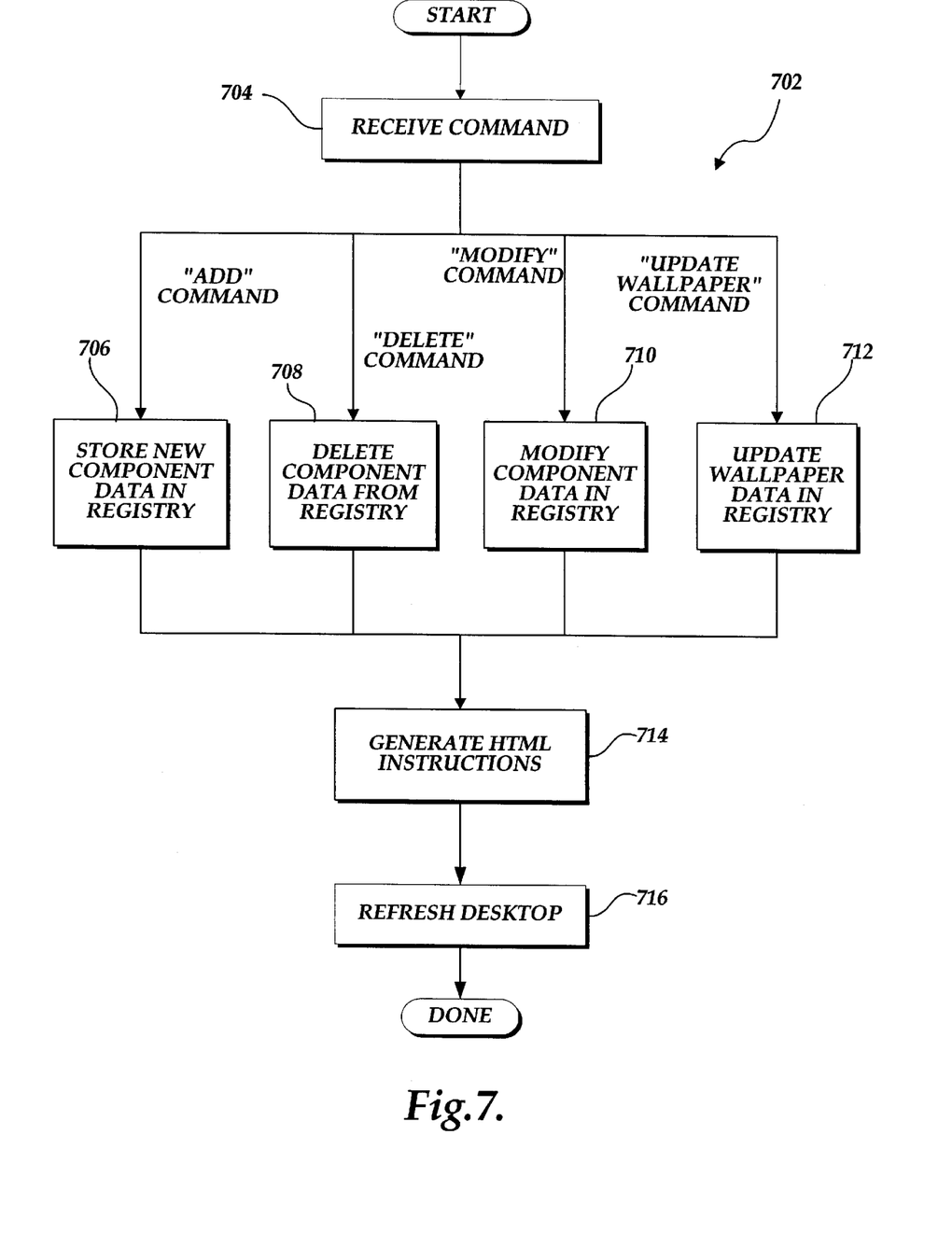
FIG. 7 is a flow diagram illustrating a process of updating a composite desktop, in accordance with the present invention.

FIG. 7 illustrates a process 702 for updating a composite desktop. In a step 704, a command is received. Preferably, the command is received using the API discussed above. After receiving a command, the action taken is dependent on the type of command. If the command received at the step 704 is an "add component" command, processing proceeds to a step 706, where data pertaining to a new component is added into the registry 208 (FIG. 2). If the command received at the step 704 is a "delete component" command, after step 704 processing proceeds to a step 708, where data pertaining to a component is deleted from the registry 208. If the command received at the step 704 is a "modify component" command, after step 704 processing proceeds to a step 710, where data pertaining to a component is modified in the registry 208. If the command received at the step 704 is an "update wallpaper" command, after step 704 processing proceeds to a step 712, where data pertaining to the wallpaper is updated in the registry 208.

After processing one of the steps 706, 708, 710, or 712, at a step 714 HTML instructions are generated from the data stored in the registry 208. The HTML instructions are stored in the desktop.htt file 210 (FIG. 2). Preferably, the composite desktop shell 206 performs the steps of processing a command, updating the registry, and creating HTML instructions.

After HTML instructions are generated, at a step 716 the HTML viewer 212 (FIG. 2) reads the desktop.htt file 210 and refreshes the composite desktop. As can be understood according to the API discussed above, options are available for updating the registry without generating new HTML, or refreshing the composite desktop without updating the register.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-based method of displaying information in a graphical user interface displayed on a computer monitor, the method comprising:

providing a composite desktop having an icon layer and a markup language layer, the icon layer being configured to display icons that are linked to resources of a computer system, the markup language layer being configured to display components identified by markup language instructions stored in association with the markup language layer;

receiving a specification of at least one component to be included in the markup language layer, wherein the specification includes an associated address specification that identifies a location at which data related to the component is available for retrieval; and displaying, in the markup language layer, an image representative of the data related to the component by processing the markup language instructions stored in association with the markup language layer.

2. The method of claim 1, further comprising:

in response to receiving the specification of the component, automatically creating instructions to display the image.

3. The method of claim 2, wherein the instructions include instructions for updating the image according to a specified schedule.

4. The method of claim 1, wherein the markup language instructions are hypertext markup language instructions.

5. The method of claim 1, comprising receiving a specification of a plurality of components.

6. The method of claim 1, further comprising:

displaying at least one icon separate from the image and in front of the image on the desktop display; and maintaining an ordering of the icon and the image so that the icon remains in front of the image when a user interacts with the image.

7. The method of claim 6, wherein the graphical user interface includes a plurality of icons, further comprising:

creating an icon window that includes the plurality of icons; and displaying the icon window in front of the desktop display.

8. The method of claim 7, wherein the icon window is a transparent window or a complex regional window comprising a plurality of discontiguous regions, each region including at least a portion of a corresponding icon.

9. The method of claim 1, further comprising:

displaying a Web page including an image of the component and a control corresponding to the component, wherein activation of the control by a user causes the component to be included in the desktop view.

10. The method of claim 1, wherein the graphical user interface includes at least one application window, the method further comprising:

displaying the application window in front of the image representative of the component; and maintaining an ordering of the image so that the image remains behind the application window.

11. A computer-readable medium having computer-executable instructions for performing the steps recited in claim 1.

12. A computer-based method of interpreting and displaying an image described by HTML data comprising:

invoking, by a first program, an add component method having a method parameter that specifies a component, said add component method including HTML data that describes an image;

receiving, by a second program, the add component method invocation including the method parameter; and adding the component specified by the method parameter to an HTML layer of a composite desktop of a graphical user interface having an icon layer and an HTML layer for interpreting and displaying the image described by the HTML data.

13. The method of claim 12, further comprising:

invoking, by the second program, a modify component method having a plurality of method parameters comprising a specification of data to be modified and a designation of replacement data;

receiving, by the first program, the modify component method invocation and parsing the invocation to receive the modify component parameters; and modifying the component specified by the specification of the component to be modified.

14. The method of claim 12, further comprising receiving the second program from a server computer prior to the invocation of the add component method.

15. A computer-based system for controlling the display of elements on a desktop having a plurality of icons displayed thereon, the system comprising:

a composite desktop having an icon layer and an HTML layer, the icon layer including an icon window including the plurality of icons; and the HTML layer including a component window including the elements, wherein the icon window is displayed in front of the component window.

16. The system of claim 15, wherein the icon window is a transparent window or a discontiguous window comprising a plurality of regions, each region containing at least a portion of an associated icon.

17. The system of claim 15, wherein the icon window includes at least a portion that is transparent, and wherein at least part of a component is visibly displayed within a transparent portion of the icon window.

18. The system of claim 15, further comprising program code for:

receiving a specification of an network address; and associating the network address with a component.

19. A computer-based method of displaying information on a graphical user interface composite desktop displayed on a computer monitor, the method comprising:

displaying a component of a Web page in a Web browser application visible in the graphical user interface, wherein the component has an associated network address specifying a location for obtaining data pertaining to the component;

providing a control embedded in the Web page; said control being associated with the displayed component, the control containing code for invoking the command to add the component to the composite desktop;

receiving a command to add the component to the composite desktop, the command including the associated network address;

receiving a specification of a location on the composite desktop for displaying the component;

retrieving the data pertaining to the component from the location specified by the network address; and displaying the data pertaining to the component on the composite desktop.

20. The method of claim 19, comprising:

dragging an image representing the component from the Web page to the desktop; and dropping the image representing the component on the desktop.

21. The method of claim 19, wherein the control invokes the command in response to receiving a selection of the control by a user.

* * * * *

UNITED STATES PATENT AND TRADEMARK OFFICE
CERTIFICATE OF CORRECTION

PATENT NO. : 6,278,448 B1
DATED : August 21, 2001
INVENTOR(S) : C.R. Brown et al.

It is certified that error appears in the above-identified patent and that said Letters Patent is hereby corrected as shown below:

Column 6,
Lines 26, 30, 60 "Windows 95" should read -- Windows 95 --

Column 8,
Lines 35 and 37, "pwsZPattern," should read -- pwszPattern, --

Column 9,
Lines 2, 8, 13, 27,32, 47, 51 and 53 delete barred separator lines from List
Line 18, "COMP_TYPB_*" should read -- COMP_TYPE_* --
Lines 62, indent the line beginning "AD_APPLY_HTMLGEN"

Column 9, lines 55-67 and Column 10, lines 1-9,
Beginning "NOTE: Make sure you set" and ending with "changes actually happened)" should be printed in the same small font size as the list Column 12,
Line 12, "11 D0-BC94-" should read -- 11D0-BC94- --
Line 38, "name=" should read -- name¯ --

Column 13,
Line 4, "Line 14" should read -- line 14 --

Signed and Sealed this

Thirty-first Day of May, 2005

JON W. DUDAS
*Director of the United States Patent and Trademark Office*